United States Patent
Kodaira et al.

[11] Patent Number: 6,135,625
[45] Date of Patent: Oct. 24, 2000

[54] STRUCTURE FOR ATTACHING LIGHTING CIRCUIT FOR ELECTRIC DISCHARGE LAMP FOR MOTORCYCLE

[75] Inventors: Shigeru Kodaira; Kenichi Takeda; Mutsumi Katayama, all of Wako, Japan

[73] Assignee: Honda Giken Kogyo Kabushiki Kaisha, Tokyo, Japan

[21] Appl. No.: 09/225,324

[22] Filed: Jan. 5, 1999

[30] Foreign Application Priority Data

Jan. 9, 1998 [JP] Japan ................................. 10-003451

[51] Int. Cl.⁷ ............................... F21V 33/00; B62J 6/00
[52] U.S. Cl. ........................... 362/476; 362/475; 362/473
[58] Field of Search ................... 362/473–476; 340/468–478

[56] References Cited

U.S. PATENT DOCUMENTS

| | | | |
|---|---|---|---|
| 2,542,926 | 2/1951 | Jozif et al. | 362/475 |
| 3,099,400 | 7/1963 | Holmes | 362/476 |
| 4,189,762 | 2/1980 | Nakazawa | 362/475 |
| 4,356,536 | 10/1982 | Funabashi et al. | 362/476 |
| 4,515,405 | 5/1985 | Ogishima | 340/476 |
| 4,620,177 | 10/1986 | Hatanaka et al. | 340/475 |
| 4,625,264 | 11/1986 | Nagashima | 362/476 |
| 4,644,318 | 2/1987 | Miyamaru et al. | 340/476 |
| 5,597,232 | 1/1997 | Ohashi et al. | 362/265 |
| 6,036,339 | 3/2000 | Idoeta | 362/476 |

FOREIGN PATENT DOCUMENTS

B2 5-32262  5/1993  Japan.
B2 2-542962 7/1996  Japan.

*Primary Examiner*—Sandra O'Shea
*Assistant Examiner*—Bryan P. Stanley
*Attorney, Agent, or Firm*—Birch, Stewart, Kolasch & Birch, LLP

[57] ABSTRACT

To shorten a high voltage line connecting a lighting circuit and an electric discharge lamp, and to achieve weight reduction of a stay, in a head lamp of a motorcycle. A stay 26L is attached to a flange 24L, a head lamp 27 is attached to a front end of the stay 26L, and a lighting circuit box 30 is arranged substantially between the head lamp 27 and the flange 24L. The lighting circuit box is arranged on the front side of the head pipe of the motorcycle. Therefore, the lighting circuit box can be located near the head lamp. As a result, the lighting circuit is arranged at a position as near as possible to both the body of the motorcycle and the lamp body, the high voltage line is shortened, and countermeasures against insulation or high frequency hazards can be taken easily and inexpensively.

18 Claims, 9 Drawing Sheets

STRUCTURE FOR ATTACHING LIGHTING CIRCUIT FOR ELECTRIC DISCHARGE LAMP FOR MOTORCYCLE

BACKGROUND OF THE INVENTION

1. Field of the Invention

The present invention relates to a structure of attaching a lighting circuit for an electric discharge lamp in a motorcycle.

2. Description of Related Art

According to Japanese Examined Patent Publication No. Hei 5-32262 entitled "Structure of supporting two-lamp type head lamp of motorcycle etc.", as shown by FIG. 5 of this publication, an attaching stay 34 is extended from a head pipe 13 and head lights 32 are attached to a front end of the attaching stay 34 via connecting plates 40. As seen in this example, it is conventional to extend a stay or a bracket from the body of the motorcycle and attach a head light to the stay or the bracket.

According to an electric discharge lamp which has been adopted in a passenger vehicle in recent years, a large luminous flux number is provided and downsizing of the lamp is facilitated. Therefore, the adoption of this electric discharge lamp has also been studied for use in a motorcycle.

For example, a vehicular head lamp 1 shown by FIG. 1 of Japanese Patent No. 2542962 entitled "Head lamp for vehicle", has an electric discharge lamp 8. Numeral 27 designates a lighting circuit for generating a high voltage power source.

When the stay is forwardly extended and the vehicular head lamp 1 which includes the lighting circuit 27 is attached to the front end of the stay, problems are experienced. For example, the lighting circuit 27 is heavy since it incorporates a transformer or semiconductors for boosting. Accordingly, the stay becomes unnecessarily stout. Therefore, a total weight of the body of the motorcycle is increased, and a moment operating on the body is enlarged when the heavy vehicular head lamp 1 is arranged at a portion remote from the vehicle body.

Therefore, the only alternative includes a heavy lighting circuit 27 attached to a side of the body of the motorcycle on a rear side of the head pipe and the lighting circuit 27 and the electric discharge lamp connected by a high voltage line. However, in addition to the above-mentioned problems, the high voltage line is very long and is therefore located around the handle post of the motorcycle. Therefore, the wiring layout becomes problematic.

SUMMARY OF THE INVENTION

It is therefore an object of the present invention to arrange a lighting circuit at a position as near as possible to both the body of a motorcycle and the lamp body, to shorten a high voltage line connecting a lighting circuit and an electric discharge lamp and achieve weight reduction of the stay.

In order to resolve the above-described problem, according to a first aspect of the present invention, a structure is provided for attaching a lighting circuit to an electric discharge lamp of a motorcycle having a head pipe installed at a front portion of the body frame, a front fork rotatably attached to the head pipe and an electric discharge lamp arranged on a front side of the head pipe. This aspect of the present invention includes a lighting circuit box for the electric discharge type head lamp arranged on the front side of the head pipe, in the vicinity of the head pipe and on a rear side of the head lamp.

By arranging the lighting circuit box on the front side of the head pipe, in the vicinity of the head pipe and on the rear side of head lamp, the lighting circuit box can be made adjacent to the head lamp. As a result, the high voltage line can be shortened. In addition, prevention against insulation or high frequency hazards can be easily and inexpensively performed.

According to a second aspect of the present invention, the lighting circuit box is attached to a side of the front fork, between left and right fork pipes of the front fork.

The high voltage line connecting the head lamp and the lighting circuit is liable to thicken and to affect the steering of the motorcycle. This problem can be reduced by pivoting the lighting circuit box along with the front fork.

According to a third aspect of the present invention, the lighting circuit box is a thin box having a length larger than a height and a breath thereof. The lighting circuit box is arranged with the face which includes the height and the width having a small area made to face a side face of the body of the motorcycle. Due to this arrangement, when the lighting circuit box is laid out between the head pipe and the headlamp, the degree of freedom of the layout is increased.

According to a fourth aspect of the present invention, a structure for attaching a lighting circuit for an electric discharge lamp for a motorcycle having a head pipe installed at a front portion of a body frame of the motorcycle, a front fork rotatably attached to the head pipe, and an electric discharge headlamp arranged on a front side of the head pipe, includes a stay for supporting the head lamp extended from the head pipe or the body frame and a lighting circuit box for the electric discharge lamp attached to the stay.

The lighting circuit box is attached to the stay and therefore, the limited space for arrangement around the head pipe of the motorcycle can be utilized extremely effectively.

According to a fifth aspect of the present invention, the stay includes an upper stay portion and a lower stay portion separated in an upward and downward direction with an opening therebetween.

By forming the stay of the frame body in this manner, weight reduction can be achieved while maintaining rigidity. At the same time, the lighting circuit box can be integrated and checked through the opening between the upper and lower stay portions.

According to a sixth aspect of the present invention, the lighting circuit box is attached to an attached member via an elastic member.

By eliminating direct connection between the attached member and the lighting circuit box by the elastic member, transmission of force or warp from the side of the attached member to the lighting circuit box is avoided. In addition, the rigidity of the lighting circuit box need not be enhanced so much, and weight reduction of the lighting circuit box can be achieved.

According to a seventh aspect of the present invention, the lighting circuit box is fixedly attached to an attached member. For example, by making the lighting circuit box span two pieces of the stays, the lighting circuit box an effective reinforcement member can be produced.

According to an eighth aspect of the present invention, a structure for attaching a lighting circuit for an electric discharge lamp for a motorcycle having a head pipe installed at a front portion of a body frame of the motorcycle, a front fork rotatable attached to the head pipe, and an electric discharge headlamp arranged on a front side of the head pipe, includes the lighting circuit box attached to the head pipe or the body frame and the head lamp attached to the lighting box directly or via a front stay by which the lighting circuit box forms a total or a portion of a rigid member of the front stay.

When the stay is extended from the head pipe and the head lamp is attached to the front end of the stay, the lighting circuit box substitutes for a portion or a total of the stay. As a result, due to weight reduction or omission of the stay, reduction in the number of parts can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

The present invention will now be described with reference to the accompanying drawings. Furthermore, the relationship between the respective embodiments, the first embodiment through the seventh embodiment mentioned below, and FIGS. 13 and 14 will be described for reference.

Figure 1:
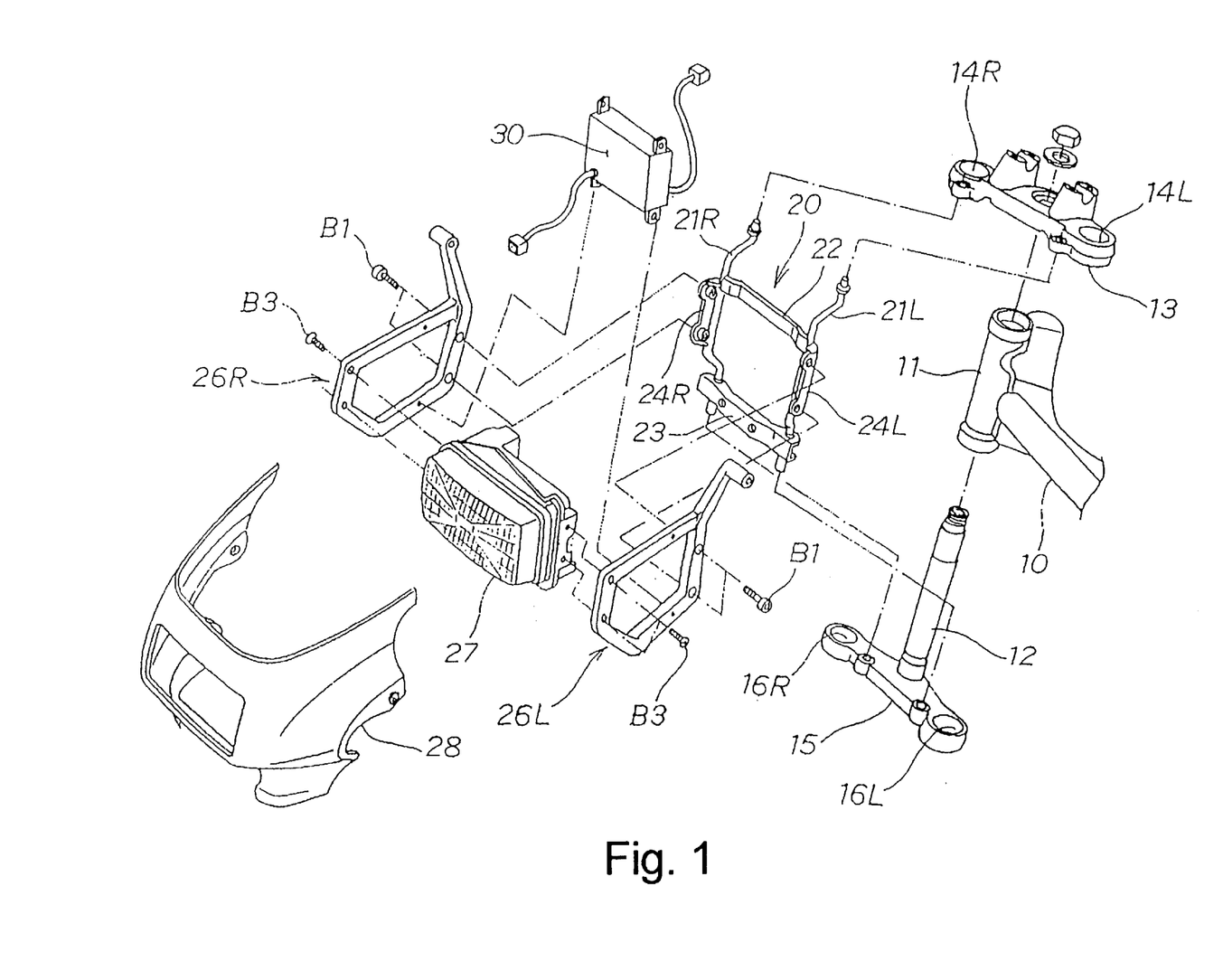
FIG. 1 is a disassembled perspective view of a structure for attaching a lighting circuit for an electric discharge lamp of a motorcycle according to the present invention (first embodiment)

FIG. 1 is a disassembled perspective view of a structure for attaching a lighting circuit for an electric discharge lamp for a motorcycle according to the first embodiment of the present invention. FIG. 1 illustrates a head pipe 11 installed at a front portion of a body frame 10, a steering stem 12 rotatably attached to the head pipe 11, and a top bridge 13 attached to an upper portion of the steering stem 12. A front fork is rotatably mounted by inserting left and right fork pipes, not illustrated, from below into left and right holes 14L and 14R (notation L designates left and notation R designates right, left and right are viewed from a passenger's perspective, the following description uses the same L and R notations) formed on the top bridge 13, as well as left and right holes 16L and 16R formed on a bottom bridge 15 at a lower portion of the steering stem 12. A bracket 20 in a "#" shape (bracket 20 comprises a left vertical member 21L, a right vertical member 21R, an upper cross member 22 and a lower cross member 23 spanning the members 21L and 21R and flanges 24L and 24R forwardly extended from the left and the right vertical members 21L and 21R) is attached to the upper and the lower bridges 13 and 15 by inserting upper ends of the left and the right vertical members 21L and 21R into the top bridge 13 and inserting lower ends of the left and the right vertical members 21L and 21R into the bottom bridge 15. A left stay 26L and a right stay 26R in a frame-like shape are attached to the left and the right flanges 24L and 24R. An electric discharge head lamp 27 (hereinafter, simply described as "head lamp 27") is attached to front ends of the left and the right stays 26L and 26R, and a lighting circuit box 30 is arranged between the left and the right stays 26L and 26R. Numeral 28 designates a front cowl.

Figure 2:
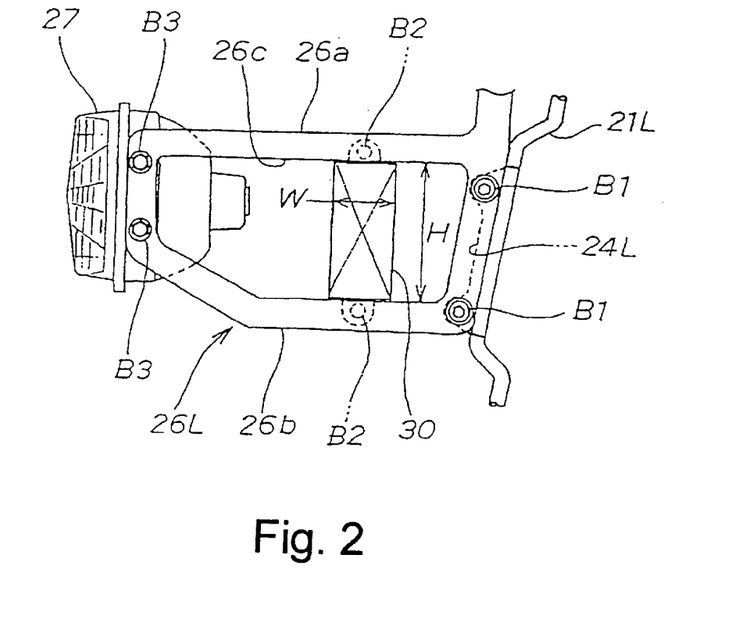
FIG. 2 is a side view of the first embodiment according to the present invention.

FIG. 2 is a side view of the first embodiment according to the present invention showing that the left stay 26L is attached to the flange 24L, the head lamp 27 is attached to a front end of the left stay 26L, and the lighting circuit box 30 is arranged at a substantially middle portion between the headlamp 27 and the flange 24L. The flange 24R and the right stay 26R are similarly arranged. Notations B1, B2 and B3 designate bolts for attachment.

The left stay 26L is a frame having an upper stay portion 26a and a lower stay portion 26b and is provided with a large opening portion 26c at a center thereof. The lighting circuit box 30, a rear portion of the head lamp 27 and a high voltage line (not illustrated) connecting these can be accessed from a side direction through the opening portion 26c.

Figure 3:
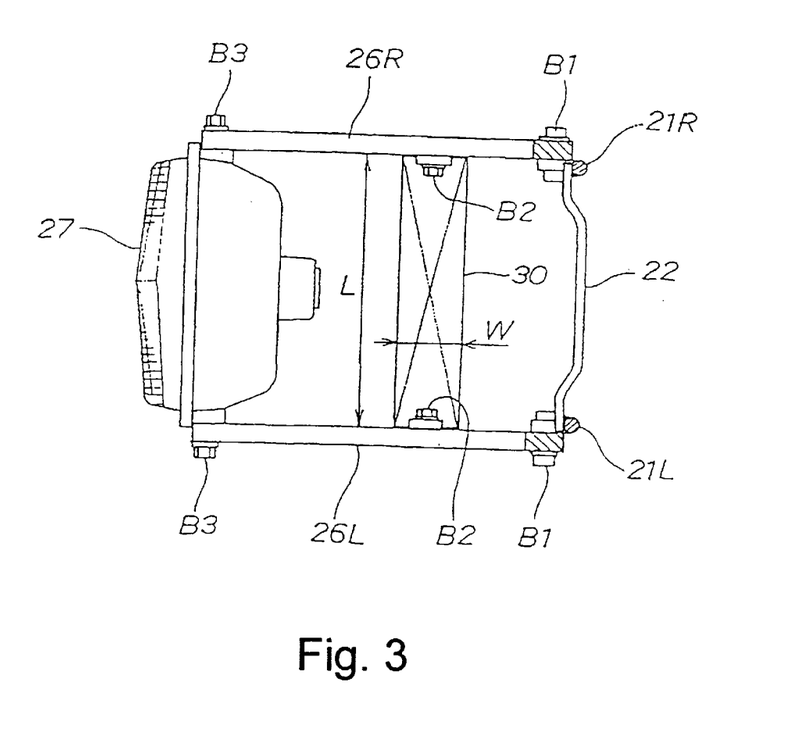
FIG. 3 is a plan view of the first embodiment according to the present invention.

FIG. 3 is a plan view of the first embodiment according to the present invention. The lighting circuit box 30 is a thin box having a length L larger than the height H (refer to FIG. 2) and the width W. The box is made to span the left and the right stays 26L and 26R. As a result, as shown by FIG. 2, a face of height H×width W is made to face a side face of the motorcycle. As is apparent from FIG. 2 and FIG. 3, there this provides an allowance for moving the lighting circuit box 30 in a left and right direction for simplifying the layout of the high voltage line.

Furthermore, when the rigidity of the lighting circuit box 30 is high, and the lighting circuit box 30 is fixed to the left and the right stays 26L and 26R by the bolts B2, the lighting circuit box 30 constitutes an effective strength member and increases the bending rigidity and flexing rigidity of the left and right stays 26L and 26R.

Figure 4:
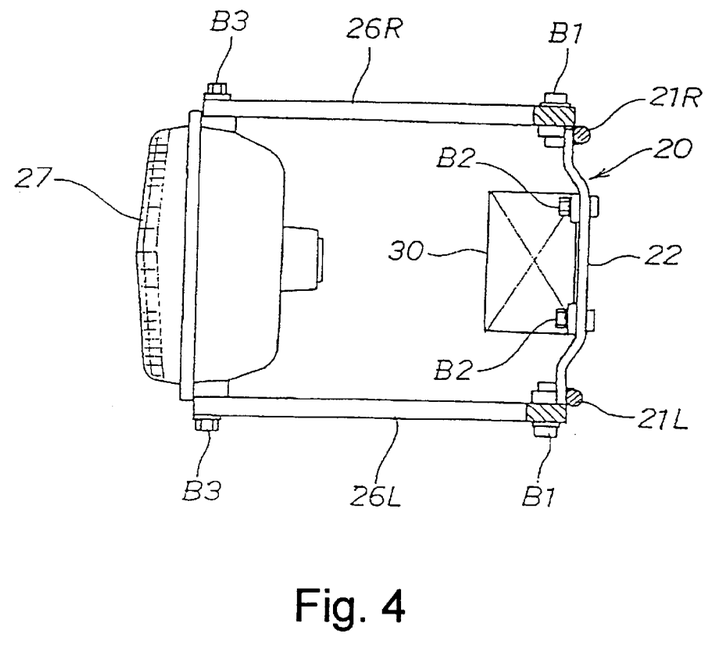
FIG. 4 is a plan view of a second embodiment according to the present invention.

FIG. 4 is a plan view of the second embodiment according to the present invention illustrating that the lighting circuit box 30 is attached to the upper and the lower cross members 22 and 23 (lower cross member 23 is not illustrated) of the bracket 20. As a result, a large space can be ensured between the head lamp 27 and the lighting circuit box 30.

Figure 5:
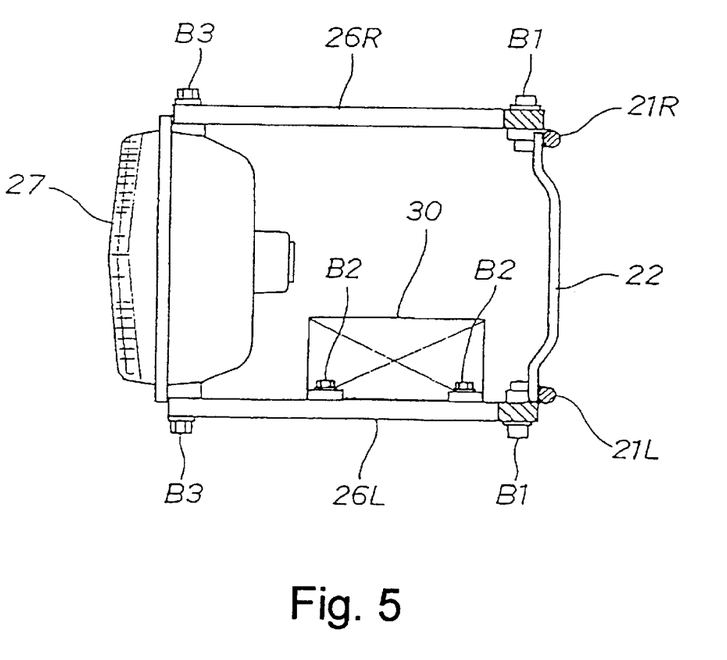
FIG. 5 is a plan view of a third embodiment according to the present invention.

FIG. 5 is a plan view of the third embodiment according to the present invention showing that the lighting circuit box 30 is attached to the left stay 26L from an inner side thereof. In this way, only one of the left and the right stays 26L and 26R is attached with the lighting circuit box 30.

An explanation of the operation of the first embodiment will now be provided through the third embodiment mentioned above as follows.

In any one of the above-mentioned embodiments, the lighting circuit box 30 is arranged between the left and right stays 26L and 26R. The left and right stays 26L and 26R are disposed at insides of the left and the right fork pipes. Accordingly, the lighting circuit box 30 is arranged between the left and the right fork pipes, adding to the appearance of the motorcycle. Furthermore, by arranging the lighting circuit box 30 at a front side of the head pipe 11, the lighting circuit box 30 is near the head lamp 27. As a result, the high voltage line is shortened, and countermeasures against insulation or high frequency hazards can be performed easily and inexpensively.

The high voltage line connecting the head lamp 27 and the lighting circuit box 30 is liable to thicken and to affect the bending in steering, since the high voltage line is shorter than a conventional high voltage line. Therefore, the lighting circuit box 30 is made movable along with the side of the front fork to reduce such an influence.

According to the first embodiment, the lighting circuit box 30 includes a thin box with the face having a small area facing the side face of the motorcycle. Therefore, when the lighting circuit box 30 is arranged between the head pipe 11 and the head lamp 27, the degree of freedom of layout is increased.

Figure 6:
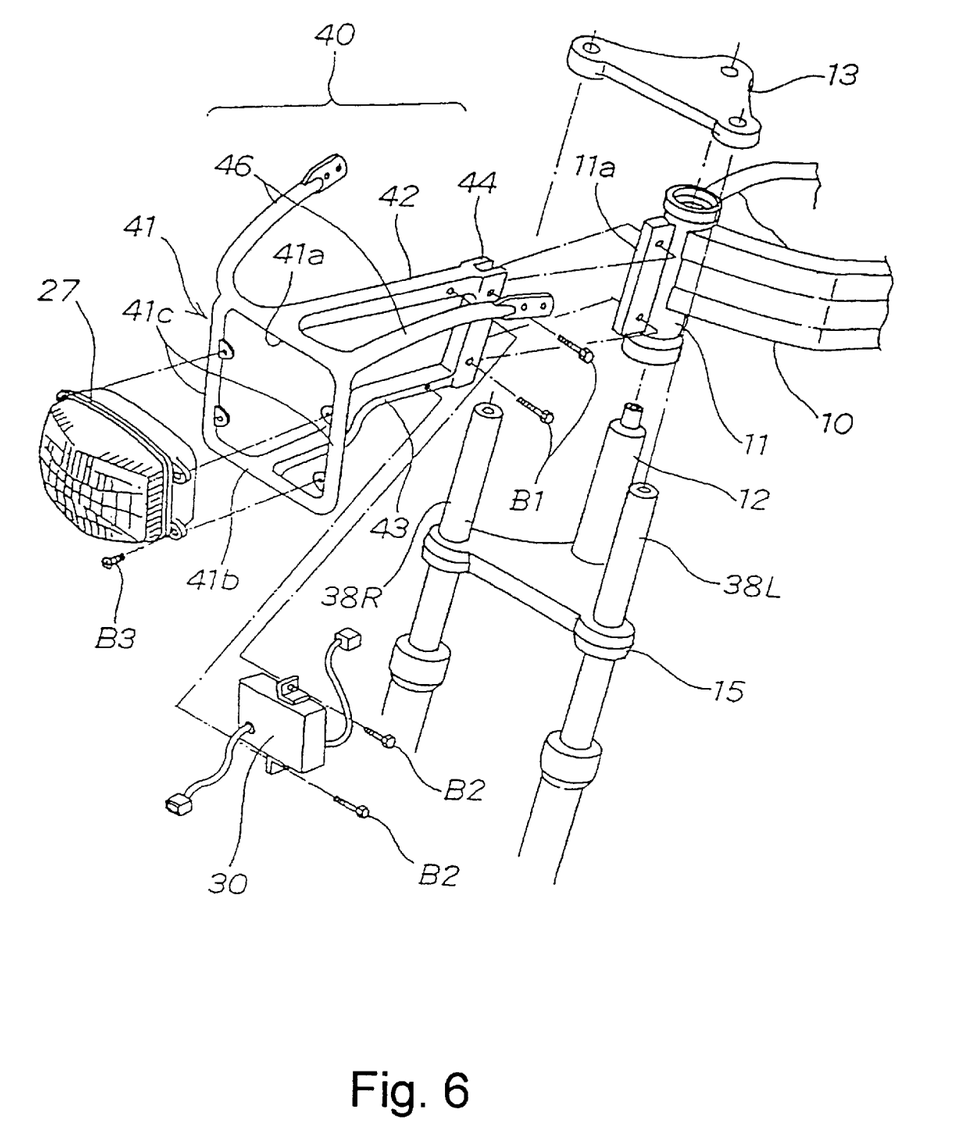
FIG. 6 is a disassembled perspective view of a fourth embodiment according to the present invention.

FIG. 6 is a disassembled perspective view of a fourth embodiment according to the present invention. Elements common to those of FIG. 1 are identified by the same reference numerals.

This embodiment features a stay 40 attached to a flange 11a extending forwardly from the head pipe 11. The head lamp 27 is attached to a front portion of the stay 40. The lighting circuit box 30 is attached to a middle portion of the stay 40. Accordingly, the lighting circuit box 30 is attached to a side of the body frame 10. Reference numerals 38L and 38R designate left and right fork pipes of the front fork.

An upper stay portion 42 is extended rearward from a center of an upper frame 41a of a rectangular frame 41 (comprising the upper frame 41a, a lower frame 41b and vertical frames 41c) for containing the head lamp 27. A lower stay portion 43 is extended rearward from a center of the lower frame 41b. The stay 40 is attached to the flange 11a via a pinch flange 44 by the bolts B1. Numeral 46 designates branch stays for supporting a front cowl and turn signal lamps, not illustrated.

Figure 7:
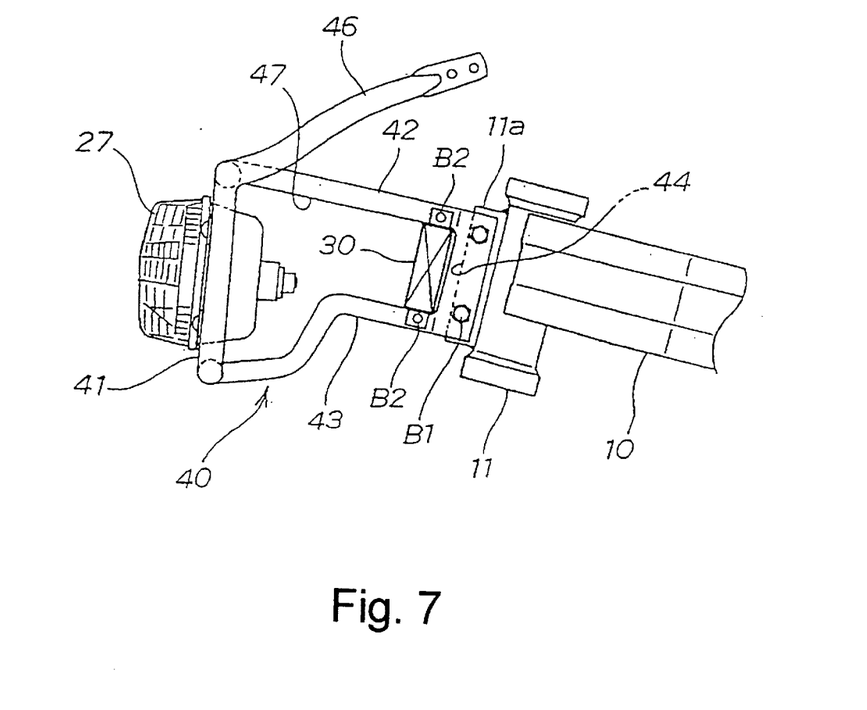
FIG. 7 is a side view of the fourth embodiment according to the present invention.

FIG. 7 is a side view of the fourth embodiment illustrating the stay 40 attached to the side of the head pipe 11, the head lamp 27 attached to the front portion of the stay 40, and the lighting circuit box 30 attached to the stay 40 at a position adjacent to the pinch flange 44. Numeral 47 designates a large opening portion between the upper stay portion 42 and the lower stay portion 43. Furthermore, the lower stay portion 43 is formed in an S shape in a lateral view as a whole. A space for containing the head lamp 27 is obtained by lowering a front portion of the stay portion 43 and attachment of the stay portion 43 to the head pipe 11 is improved by elevating a rear portion of the stay portion 43.

Figure 8:
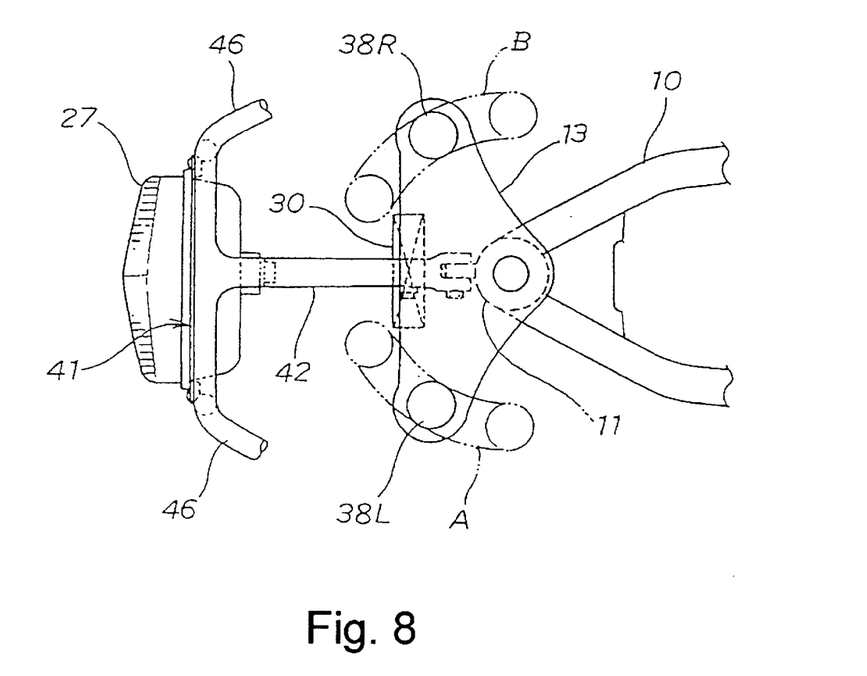
FIG. 8 is a plan view of the fourth embodiment according to the present invention.

FIG. 8 is a plan view of the fourth embodiment according to the present invention in which A designates a turn locus of the left fork pipe 38L and B designates a turn locus of the right fork pipe 38R. The turn loci A and B can be avoided since the lighting circuit box 30 is made adjacent to the side of the head pipe 11.

Figure 9:
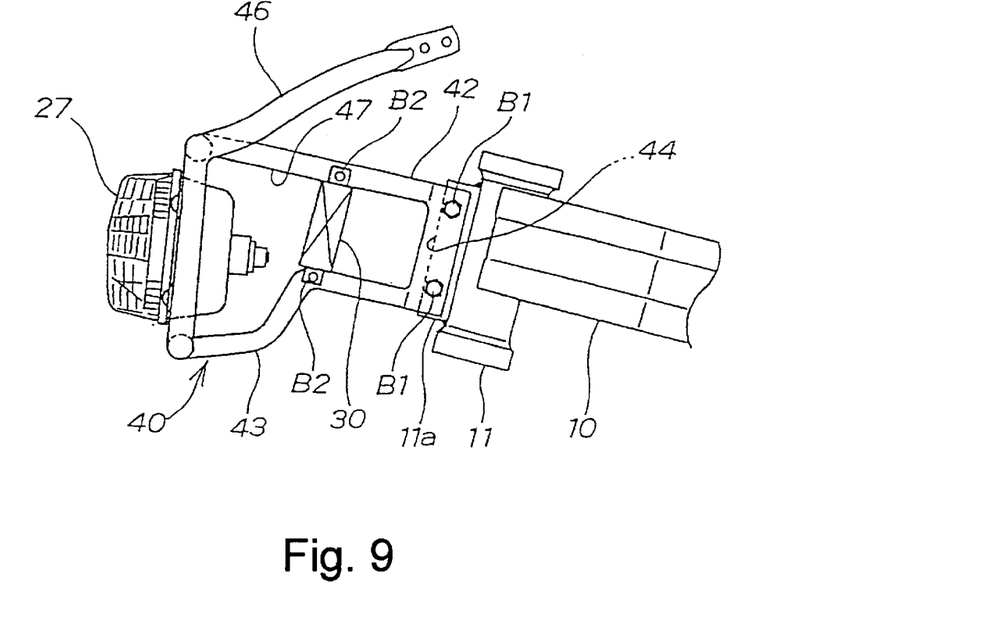
FIG. 9 is a side view of a fifth embodiment according to the present invention.

FIG. 9 is a side view of the fifth embodiment according to the present invention illustrating the stay 40 attached to the side of the head pipe 11, the head lamp 27 attached to the front portion of the stay, and the lighting circuit box 30 attached substantially between the head lamp 27 and the head pipe 11.

Figure 10:
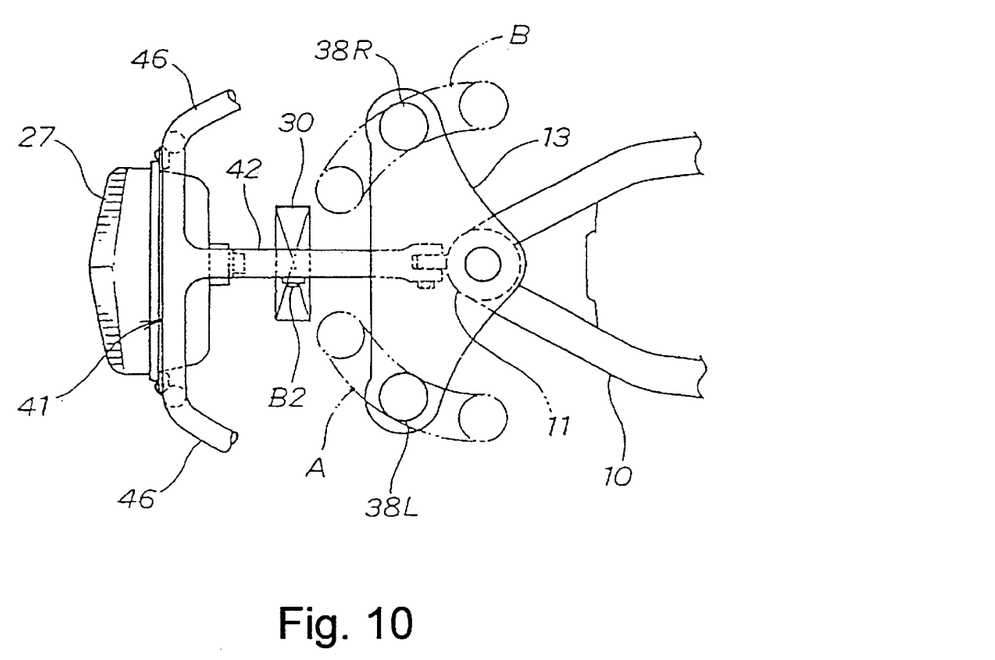
FIG. 10 is a plan view of the fifth embodiment according to the present invention.

FIG. 10 is a plan view of the fifth embodiment according to the present invention in which A designates a turn locus of the left fork pipe 38L and B designates a turn locus of the right fork pipe 38R. The turn loci A and B can be avoided since the lighting circuit box 30 is made adjacent to the side of the head lamp 27.

Figure 11:
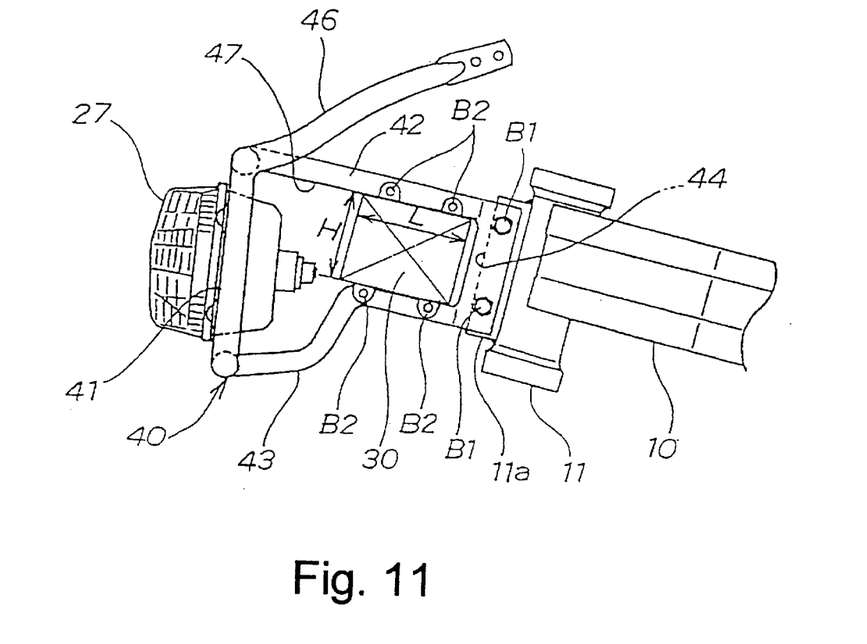
FIG. 11 is a side view of a sixth embodiment according to the present invention.

FIG. 11 is a side view of the sixth embodiment according to the present invention illustrating the stay 40 attached to the side of the head pipe 11, the head lamp 27 attached to the front portion of the stay 40, and the lighting circuit box 30 attached to the stay 40 so that the face of length L×height H faces the side face of the motorcycle.

Figure 12:
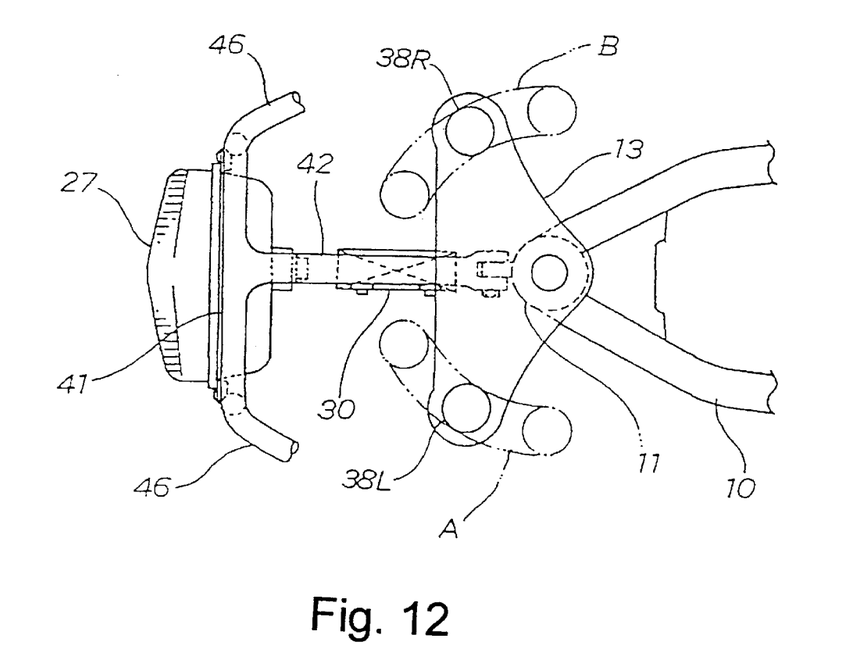
FIG. 12 is a plan view of the sixth embodiment according to the present invention.

FIG. 12 is a plan view of the sixth embodiment according to the present invention in which A designates a turn locus of the left fork pipe 38L and B designates a turn locus of the right fork pipe 38R. It is shown that the turn loci A and B can be avoided since a longitudinal axis of the lighting circuit box 30 is aligned with the center of the body.

A description will now be given to explain the operation of the fourth through the sixth embodiments mentioned above.

A space around the head pipe of the motorcycle where arrangement space is limited can be utilized extremely effectively since the lighting circuit box 30 is attached to the stay 40.

Furthermore, the stay 40 includes a frame body having the upper stay portion 42 and the lower stay portion 43 separated in the up and down direction with the opening portion 47 therebetween. Accordingly, weight reduction can be achieved while maintaining rigidity. At the same time, the lighting circuit box 30 can be integrated and checked through the opening portion 47.

Figure 13:
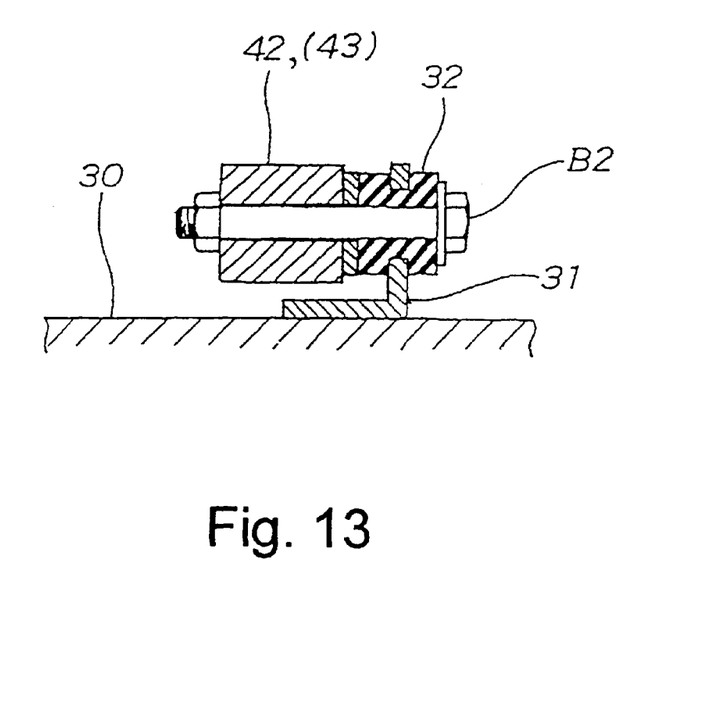
FIG. 13 is a sectional view showing a structure for elastically attaching a lighting circuit box according to the present invention.

FIG. 13 is a sectional view showing a structure for elastically attaching a lighting circuit box according to the present invention illustrating an attaching flange 31 installed to the lighting circuit box 30 and a grommet 32 made of rubber or soft resin fitted to the attaching flange 31. The grommets 32 are fastened to the upper stay portion 42 and the lower stay portion 43, which are attached members, by the bolts B2 and nuts by which the lighting circuit box 30 is elastically attached to the attached members.

By eliminating direct connection between the attached members (upper stay portion 42 and lower stay portion 43) and the lighting circuit box 30 by the grommets 32, transmission of force, warp or the like from the side of the attached members to the lighting circuit box 30 is avoided. The rigidity of the lighting circuit box 30 need not be enhanced so much, and weight reduction of the lighting circuit box 30 can be achieved.

Further, the elastic member is not limited to the above-described grommet 32 but may be, for example, a spring washer, a coned disc spring or a spring.

Figure 14:
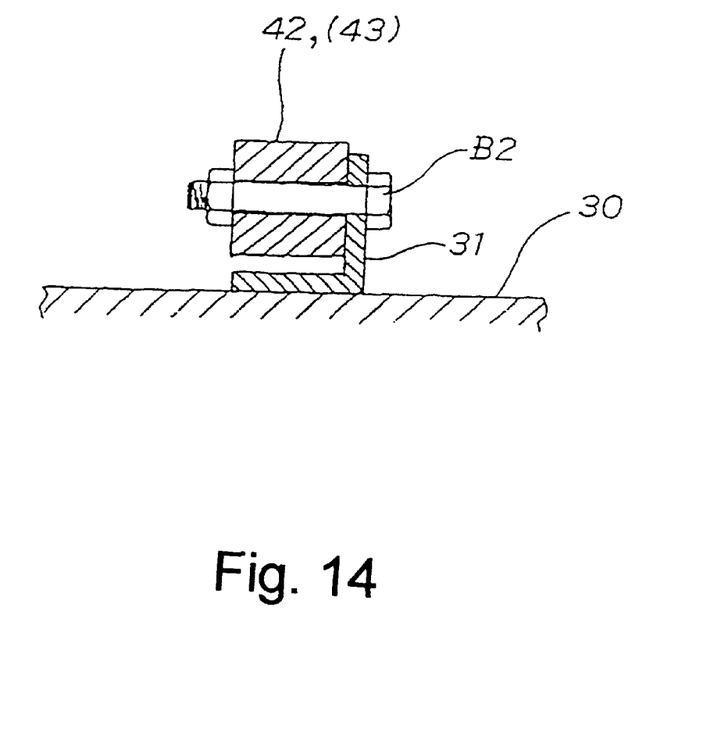
FIG. 14 is a sectional view showing a structure for fixedly attaching a lighting circuit box according to the present invention.

FIG. 14 is a sectional view illustrating a structure for fixedly attaching a lighting circuit box according to the present invention and illustrating the attaching flange 31 installed on the lighting circuit box 30 and the attaching flanges 31 are fixed to the upper stay portion 42 and the lower stay portion 43, which are attached members, directly by the bolts B2 and the nuts.

For example, when such a fixedly attaching structure is adopted in FIG. 3, total rigidity of the left and the right stays 26L and 26R can be enhanced. Similarly, when the fixedly attaching structure is adopted in FIG. 9 and FIG. 11, total rigidity of the stay 40 can be enhanced.

Figure 15:
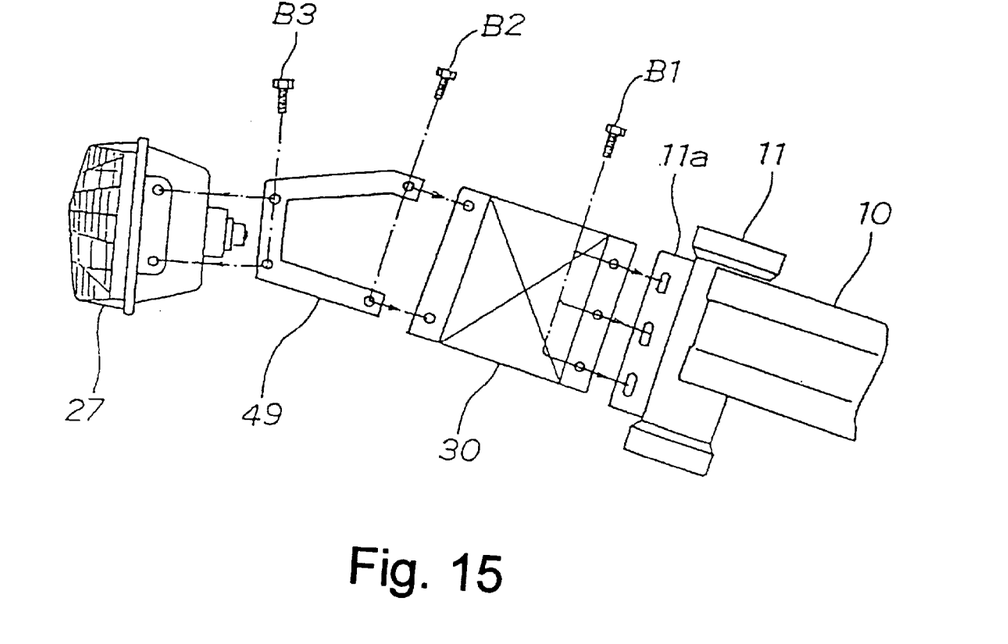
FIG. 15 is a disassembled view of a seventh embodiment according to the present invention.

FIG. 15 is a disassembled view of the seventh embodiment according to the present invention. In this example, the head pipe 11, the lighting circuit box 30 having sufficient rigidity, a front stay 49 and the head lamp 27 are integrated.

Figure 16:
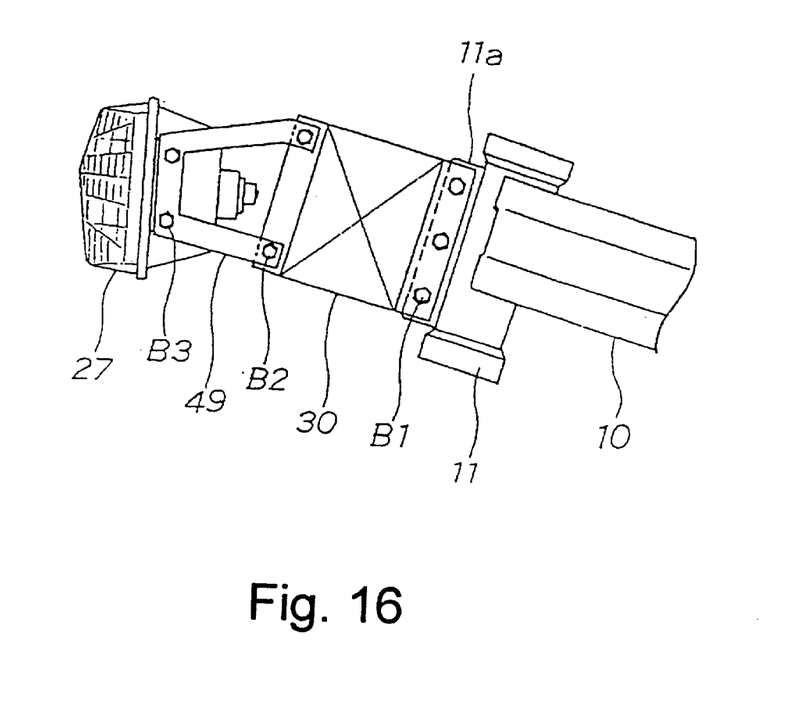
FIG. 16 is a side view of the seventh embodiment according to the present invention.

FIG. 16 is a side view of the seventh embodiment illustrating the lighting circuit box 30 attached to the head pipe 11 and the head lamp 27 attached to the lighting circuit box 30 via the front stay 49.

For example, in contrast to FIG. 7, in which the stay 40 is extended from the side of the head pipe 11, and the head lamp 27 is attached to the front end of the stay 40, in FIGS. 15 and 16, the lighting circuit box 30 substitutes for a portion or a total of the stay. As a result, by weight reduction or omission of the stay, reduction in the number of parts can be achieved.

Furthermore, the lighting circuit box 30 may be directly attached to the body frame 10 in place of the head pipe 11 and the head lamp 27 may be directly attached to the lighting circuit box 30 by omitting the front stay 49.

Furthermore, although the left and the right stays 26L and 26R and the stay 40 in the embodiments are formed in a substantially square shape in side view, the shape may be U-shaped in side view where the upper stay portion 26a or the upper stay portion 42 is cut off.

The present invention achieves the following effects by the above-described constitution.

With regard to the first embodiment of the present invention, the lighting circuit box is arranged on the front side of the head pipe, at the vicinity of the head pipe and on the rear side of the head lamp. Accordingly, the lighting circuit box can be located near the head lamp. As a result, the lighting circuit is arranged at a position as near as possible to both of the body and the lamp body, the high voltage line is shortened, and countermeasures against insulation or high frequency hazards can be easily and inexpensively taken.

The second embodiment of the present invention includes the lighting circuit box attached to the side of the front fork and contained between the left and the right fork pipes of the front fork.

The high voltage line connecting the head lamp and the lighting circuit may become less bendable due to its shortened length, therefore, steering may be affected. This problem is reduced by pivoting the lighting circuit box along with the front fork.

According to the third aspect of the present invention, the lighting circuit box is a thin box and the face which has a small area is made to face the side face of the motorcycle. Accordingly, when the lighting circuit box is arranged between the head pipe and the head lamp, the degree of freedom is increased.

According to the fourth embodiment of the present invention, the lighting circuit box is attached to the stay supporting the head lamp. Accordingly, the space around the head pipe of the motorcycle in which arrangement space is limited can be utilized extremely effectively.

According to the fifth embodiment of the present invention, the stay for supporting the head lamp is a frame body. Therefore, weight reduction can be achieved while rigidity is maintained. At the same time, the lighting circuit box can be integrated and checked through the opening portion.

The sixth embodiment or the present invention is featured in that the lighting circuit box is attached to the attached member via the elastic member. By eliminating direct connection between the attached member and the lighting circuit box by the elastic member, transmission of force, warp or the like from the side of the attached member to the lighting circuitbox is avoided. In addition, the rigidity of the lighting circuit box need not be enhanced so much end weight reduction of the lighting circuit box can be achieved.

The seventh embodiment of the present invention is featured in that the lighting circuit box is fixedly attached to the attached member. For example, by making the lighting circuit box span two pieces of the stays, the lighting circuit box can constitute an effective reinforcement member.

According to the eighth embodiment of the present invention, when the stay is extended from the head pipe and the head lamp is attached to the front end of the stay, the lighting circuit box substitutes for a portion or a total of the stay. As a result, by weight reduction or omission of the stay, reduction in the number of parts can be achieved.

The invention being thus described, it will be obvious that the same may be varied in many ways. Such variations are not to be regarded as a departure from the spirit and scope of the invention, and all such modifications as would be obvious to one skilled in the art are to be included within the scope of the following claims. The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A structure for attaching a lighting circuit for an electric discharge lamp for a motorcycle, the motorcycle including a head pipe installed at a front portion of a body frame, a front fork rotatably attached to the head pipe, and an electric discharge head lamp arranged on a front side of the head pipe, said structure comprising:

a lighting circuit box for the electric discharge lamp arranged on a front side of the head pipe, in a vicinity of the head pipe and on a rear side of the head lamp; and a bracket arranged on the front side of the head pipe;

a stay for supporting the head lamp, said stay is attached to said bracket at a first end thereof, said head lamp is attached to said stay at a second end thereof; and said lighting circuit box is attached to an intermediate portion of the stay between the bracket and the head lamp.

2. The structure for attaching a lighting circuit box for an electric discharge lamp for a motorcycle according to claim 1, wherein the lighting circuit box is attached to a side of the front fork between left and right fork pipes of the front fork.

3. The structure for attaching a lighting circuit for an electric discharge lamp of a motorcycle according to claim 2, wherein the lighting circuit box is a thin box having a length larger than a height and a width thereof, said thin box is arranged with a face having the height and width dimension of small area facing a side face of the body frame of the motorcycle.

4. The structure for attaching a lighting circuit for an electric discharge lamp for a motorcycle according to claim 1, wherein the lighting circuit box is attached to an attached member via an elastic member.

5. The structure for attaching a lighting circuit for an electric discharge lamp for a motorcycle according to claim 1, wherein the lighting circuit box is fixedly attached to an attached member.

6. The structure for attaching a lighting circuit for an electric discharge lamp for a motorcycle according to claim 1, wherein there are two stays attached to said bracket on opposite sides of said bracket with a space therebetween, and said head lamp and said lighting circuit are attached between said stays.

7. The structure for attaching a lighting circuit for an electric discharge lamp for a motorcycle according to claim 6, wherein each of said stays further includes an upper frame portion and a lower frame portion spaced from each other to form an opening therebetween.

8. A structure for attaching a lighting circuit for an electric discharge lamp for a motorcycle, the motorcycle including a head pipe installed at a front portion of a body frame, a front fork rotatably attached to the head pipe, and an electric discharge head lamp arranged on a front side of the head pipe, said structure comprising:

a stay for supporting the head lamp extended from the body frame; and a lighting circuit box for the electric discharge lamp attached to the stay.

9. The structure for attaching a lighting circuit for an electric discharge lamp for a motorcycle according to claim 8, wherein the stay includes an upper stay portion and a lower stay portion separated in an upward and downward direction with an opening therebetween.

10. The structure for attaching a lighting circuit for an electric discharge lamp for a motorcycle according to claim 8, further comprising:

a bracket arranged on the front side of the head pipe or the body frame;

said stay for supporting the head lamp is attached to said bracket at a first end thereof, said head lamp is attached to said stay at a second end thereof; and said lighting circuit box is attached to an intermediate portion of the stay between the bracket and the head lamp.

11. The structure for attaching a lighting circuit for an electric discharge lamp for a motorcycle according to claim 10, wherein there are two stays attached to said bracket on opposite sides of said bracket with a space therebetween, and said head lamp and said lighting circuit are attached between said stays.

12. The structure for attaching a lighting circuit for an electric discharge lamp for a motorcycle according to claim 11, wherein each of said stays further includes an upper frame portion and a lower frame portion spaced from each other to form an opening therebetween.

13. The structure for attaching a lighting circuit for an electric discharge lamp for a motorcycle according to claim 8, wherein the lighting circuit box is attached to an attached member via an elastic member.

14. The structure for attaching a lighting circuit for an electric discharge lamp for a motorcycle according to claim 8, wherein the lighting circuit box is fixedly attached to an attached member.

15. A structure for attaching a lighting circuit for an electric discharge lamp for a motorcycle, the motorcycle including a head pipe installed at a front portion of a body frame, a front fork rotatably attached to the head pipe, and an electric discharge head lamp arranged on a front side of the head pipe, said structure comprising:

a front stay;

a lighting circuit box attached to the body frame; and the head lamp is attached to the lighting box directly or via the front stay, wherein the lighting circuit box forms at least a portion of a rigid member of the front stay.

16. The structure for attaching a lighting circuit for an electric discharge lamp for a motorcycle according to claim 15, wherein said front stay includes an upper stay portion and a lower stay portion separated in an upward and downward direction with an opening therebetween.

17. The structure for attaching a lighting circuit for an electric discharge lamp for a motorcycle according to claim 16, said front stay further including a pair of branch stays for supporting a front cowl and turn signal lamps of the motorcycle, said branch stays extending above said upper stay portion.

18. The structure for attaching a lighting circuit for an electric discharge lamp for a motorcycle according to claim 15, further comprising:

a flange formed on the front side of the head pipe;

said front stay is for supporting the head lamp and is attached to said flange at a first end thereof, said head lamp is attached to said front stay at a second end thereof; and said lighting circuit box is attached to an intermediate portion of said front stay between said flange and said head lamp.

* * * * *